United States Patent
Belucci et al.

[11] Patent Number: 5,913,542
[45] Date of Patent: *Jun. 22, 1999

[54] SYSTEM FOR PRODUCING A PERSONAL ID CARD

[75] Inventors: Barry Belucci, Ann Arbor; Eliot Charlip, West Bloomfield, both of Mich.

[73] Assignee: Bell Data Software Corporation, Ann Arbor, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/604,603

[22] Filed: Feb. 21, 1996

Related U.S. Application Data

[63] Continuation-in-part of application No. 08/123,277, Sep. 17, 1993, Pat. No. 5,505,494.

[51] Int. Cl.⁶ .................................................. B42D 15/00
[52] U.S. Cl. ............................ 283/75; 283/70; 283/904
[58] Field of Search .................................. 283/72, 74, 75, 283/77, 78, 82, 67, 70, 904; 235/487, 494, 380

[56] References Cited

U.S. PATENT DOCUMENTS

| | | | |
|---|---|---|---|
| 3,571,957 | 3/1971 | Cumming | 40/2.2 |
| 4,066,873 | 1/1978 | Schatz | 235/487 |
| 4,318,554 | 3/1982 | Anderson et al. | 283/7 |
| 4,639,743 | 1/1987 | Sakura et al. | 235/494 |
| 4,998,010 | 3/1991 | Chandler et al. | 235/494 |
| 5,113,445 | 5/1992 | Wang et al. | |
| 5,337,361 | 8/1994 | Wang et al. | |
| 5,384,846 | 1/1995 | Berson et al. | 380/23 |
| 5,505,494 | 4/1996 | Bellucci et al. | 283/75 |

FOREIGN PATENT DOCUMENTS

| | | |
|---|---|---|
| 0113228A2 | 12/1983 | European Pat. Off. . |
| 0195104A1 | 3/1985 | European Pat. Off. . |
| 0599558A2 | 11/1993 | European Pat. Off. .......... G07F 7/12 |
| 58195281 | 11/1983 | Japan . |
| 2173970 | 3/1986 | United Kingdom . |
| 2173933 | 4/1986 | United Kingdom . |

OTHER PUBLICATIONS

Cornelio, Kai, "Apprentice Yesterday, Master Today" and attachments thereto, ID Systems, Jul./Aug. 1988.
Caulastics advertisement in Automatic ID News, Apr./May/ Oct. 1989, and May/Jun./Sep./Oct., 1990.
EER System Corporation memorandum, Sep. 9, 1992 (5 pages).
Supplementary European Search Report May 30, 1996.

*Primary Examiner*—Willmon Fridie, Jr.
*Attorney, Agent, or Firm*—Brooks & Kushman P.C.

[57] ABSTRACT

An identification instrument such as a pocket-sized card includes both human-recognizable and machine-readable indicia. The human-recognizable material may be any combination of photographs, graphical or textual information, with the machine-readable section encoding any or all of the human-recognizable areas in their entirety. When the card is presented for verification, the machine-readable section is scanned, decompressed and/or deciphered and compared to the database used to generate the human-recognizable section or sections. Only with a substantial matching of the information may the card and its user be authenticated. Preferably, a Symbol Technologies compliant two-dimensional barcode is used as the machine-readable encoding format. Multiple levels of encryption and decryption are also described in conjunction with enhanced security.

1 Claim, 2 Drawing Sheets

SYSTEM FOR PRODUCING A PERSONAL ID CARD

REFERENCE TO RELATED APPLICATION

This application is a continuation-in-part of U.S. patent application Ser. No. 08/123,277, filed Sep. 17, 1993, now U.S. Pat. No. 5,505,494 issued Apr. 9, 1996.

FIELD OF THE INVENTION

This invention relates generally to identification cards and the like, and more particularly to an ID card wherein human-recognizable indicia may be redundantly encoded in machine-readable form and reconstructed to verify authenticity.

BACKGROUND OF THE INVENTION

Increasing population and the need for security associated with governmental activities and corporate research and development, has prompted various employee and affiliate identification techniques. For example, in larger corporations and governmental institutions, it is common for employees to wear picture ID cards. It is also increasingly common for such individuals to carry machine-readable "keys" wherein some scanning device scrutinizes a visual or magnetic code associated with a pocket-sized card or plate in order to limit access to restricted areas. Such machine-readable devices have the added advantage that comings and goings may be monitored automatically, often by means of a centralized network.

Picture-type ID cards are likewise very popular and have been in existence for much longer than computer-readable identification instruments. Driver licenses are an obvious and ubiquitous example of a typical picture-type ID card, though numerous other examples exist such as those associated with academic and education systems.

Despite the technique used, the unscrupulous are always prepared to devise ways to undermine the system in order to gain access to unauthorized information, privileges or other valuable materials. It is not uncommon, for example, for picture-type ID cards to be tampered with by supplanting certain of the imprinted visual or textual information, thereby creating a bogus version. Indeed, a number of individuals and organizations are in the business of producing such cards.

Identification cards and systems can maintain their integrity only if they are more difficult to compromise than thieves are clever. As such, techniques are increasingly being implemented to render the falsification of ID cards and the like more difficult. These approaches may take two broad forms. One such form involves card manufacturing techniques which make duplication more difficult. The other form generally concerns encoding data so that it is either readable only by a machine or in one way or another more difficult for a human being to perceive or duplicate.

In terms of more sophisticated manufacturing, various layering and/or lamination techniques are now common, the tampering of which would be more obvious to authorized personnel. As for encoding, machine-readable areas are now being included on credit cards, and so forth. For example, the typical Visa or MasterCard now includes a magnetic stripe with encoded identification and account information, as well as a holographically produced image, the combination of which further improves security.

However, even with machine-readable codes and manufacturing techniques which are increasingly impervious to duplication, there remains a need for an identification system for cards and the like which further ensures authenticity by providing a tighter link between the data present in different forms on the card or other ID instrument. For example, even though certain sections of an ID card may contain computer-readable information while other sections contain human-recognizable visual and/or graphical information, in most cases, the two forms of information are substantially independent. As such, one or more of these independent areas may be falsified, thereby facilitating a security breach.

SUMMARY OF THE INVENTION

The present invention overcomes the prior art limitation just described by encoding certain of the visual and/or graphical information contained on an identification instrument in its entirety in machine-readable form. In this way, when the card or other such instrument is presented for access or other privileges, a machine may be used not only to decipher the encoded information, but this deciphered information may be presented in such a way that a direct comparison may be made between the machine-readable code and associated visual/graphical information.

In the preferred embodiment, an identification card bears a photographic portrait of an individual taken with a digital camera. The same database generated by the camera is also used to generate a machine-readable encoded version of the photograph which is imprinted elsewhere on the card. A verification station includes an operator-controlled computer which is capable of reading the encoded portion of the card. Software resident as part of the system formats the decoded photograph and presents a portrait derived from the decoding process on the screen of the computer which may readily and conveniently be compared with the portrait originally printed on the card itself.

The system is not limited to a comparison of photographic data, as any form of visual, graphical or textual information may also be similarly encoded from the same database information and regenerated on the computer screen for the purpose of an operator-assisted comparison.

The unique improvement offered by the present invention is that regardless of the human-recognizable material, it is encoded in machine-readable form substantially in its entirety from the same database used for the human-readable counterpart, thus facilitating a direct comparison. The system also supports the use of encryption and decryption by generating a machine-readable code from the database and imprinting that code in scrambled form on the card. A key is thus required at the verification station so that the code, once read, may be unscrambled to generate an image for comparison. The key may be delivered separately to the verification station, either physically or electronically. Alternatively, the key itself may be encoded and imprinted on the card where it may be read and used directly. Methods for producing the card and encoding the visual, graphical or textual information in a preferred machine-readable format are also detailed in the illustrations and description which follows.

DETAILED DESCRIPTION OF THE PREFERRED EMBODIMENTS

The present invention concerns methods and apparatus for producing high-security identification cards and the like. Both human-recognizable and machine-readable information are imprinted on an identification-oriented instrument, preferably a flat, pocket-sized card and, when presented for verification, the machine-readable information is used to generate a replica of the human-recognizable information. If the two forms of information are substantially similar, the likelihood is increased that the individual presenting the card is the one to whom the card was issued.

Figure 1A:
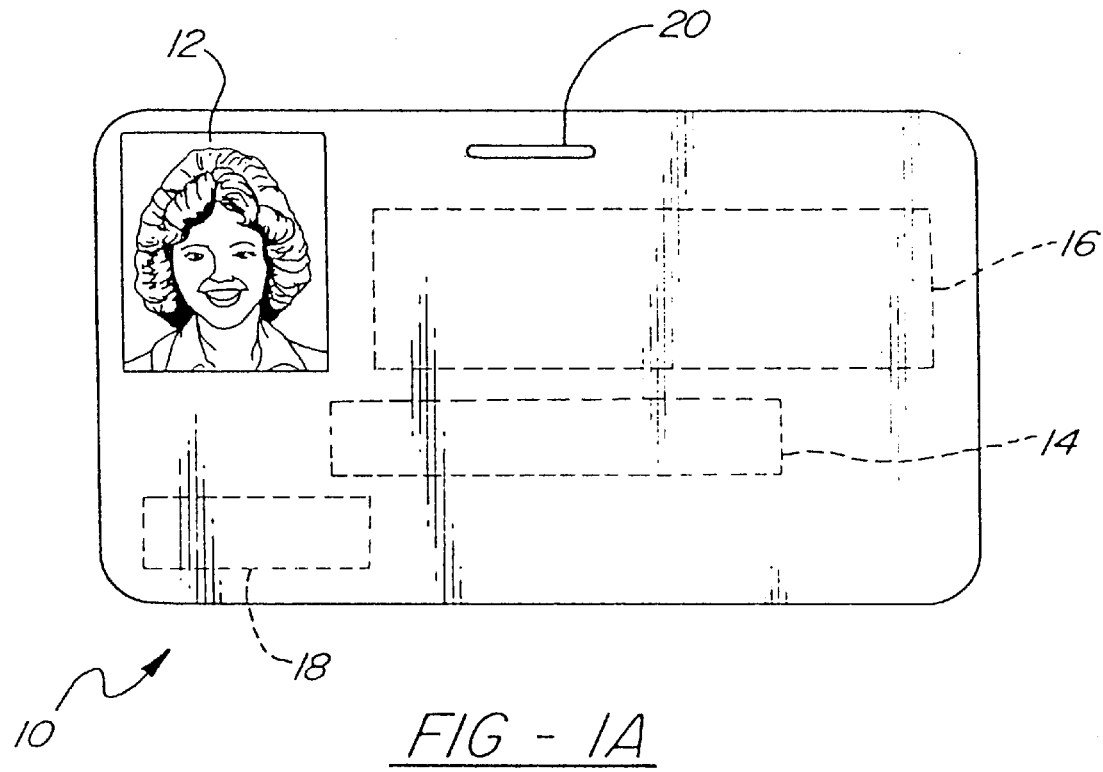
FIGS. 1A and 1B show the front side and the back side of an identification card produced in accordance with the present invention.

Now making reference to the figures, FIG. 1 illustrates an identification card formed in accordance with the present invention. FIG. 1A shows the front side of the card generally at 10, this front surface bearing a photographic portrait 12 of an individual, plus areas of the card containing related textual information. For example, in area 14 the individual's name and title may be present, in area 16 the individual's work area affiliation or other data may be present, and in area 18 an address and phone number may be present. A slot 20 may be included so that the card may have a strap for attachment to the individual's clothing, key chain, or so forth.

The layout of the various areas in FIG. 1A is by no means fixed. The various textual fields may be embellished or eliminated, and the photograph may be in black and white or color and of any size which the substrate card may support. Additionally, other photographic, graphical or textual information may be present, including a fingerprint, or other symbology, whether human-readable, machine-readable, magnetically or holographically encoded. Generally speaking, however, it is preferred that front surface 10 be limited to the presentation of human-readable photographic, graphical and textual information.

Figure 1B:
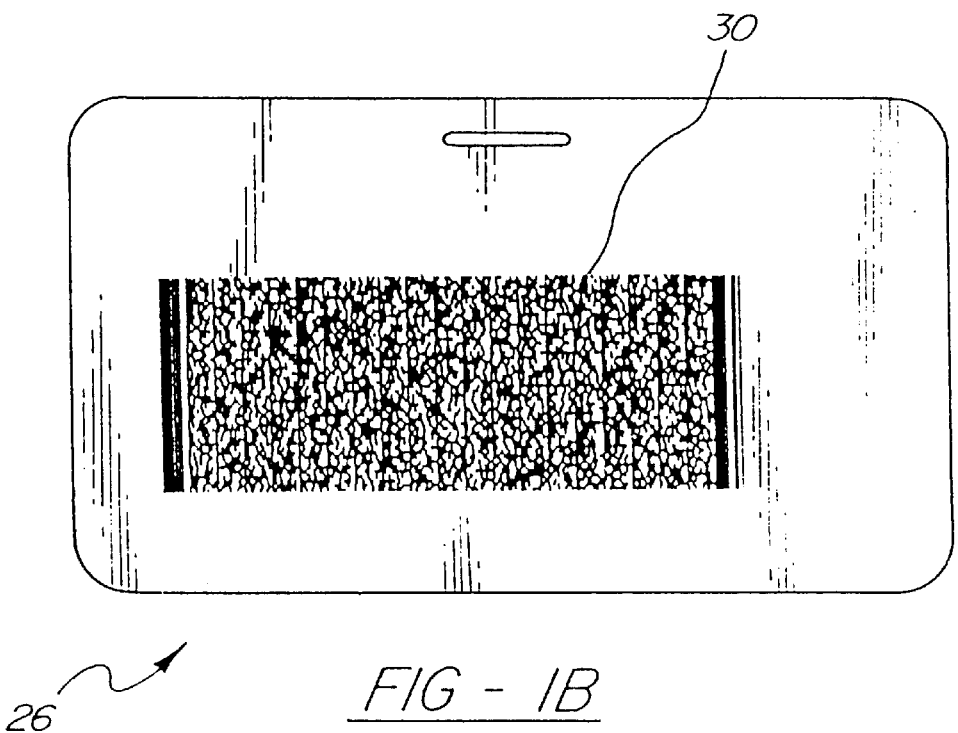

FIG. 1B shows the backside of the card of FIG. 1A, this backside being depicted generally at 26. Although other indicia may be present, in the preferred embodiment the back side contains only a computer-readable code 30, this being a two-dimensional barcode, though other methods of visually, electronically or magnetically encoding systems may be used. The two-dimensional barcode 30 illustrated in FIG. 1B, which is based upon an array of polygon-shaped printed cells and non-printed blank areas arranged along two independent axes is preferably compliant with the PDF417 two-dimensional high-density format offered by Symbol Technologies, Inc. of Bohemia, N.Y. Brochures and other literature are available from Symbol Technologies which explain how incoming data are compressed, stored and decompressed in accordance with its encoding technique.

Importantly, in keeping with the unique aspects of the present invention, regardless of the encoding system used, at least one area of human-recognizable information on the card is encoded from the same database and made available elsewhere on the card. Using this approach, when the card is presented for verification, the human-readable aspects contained within the machine-readable code, my be regenerated and compared.

In the preferred embodiment, the photographic portrait 12 shown in FIG. 1A is encoded and printed as barcode 30 in FIG. 1B using the same database. When the card is presented, code 30 is scanned, and decompressed, thereby reconstructing a substantially identical version of the photograph as printed on the card. When such a substantial match is present, it is highly unlikely that the ID card has been forged, since both the photograph and the code would need to be falsified and manufactured. Owing to the data compression and decompression techniques standardly available from Symbol Technologies, in concert with the additional levels of data encryption which will be described shortly, it is practically impossible to falsity an ID card or other instrument formed in accordance with the present invention.

Figure 2A:
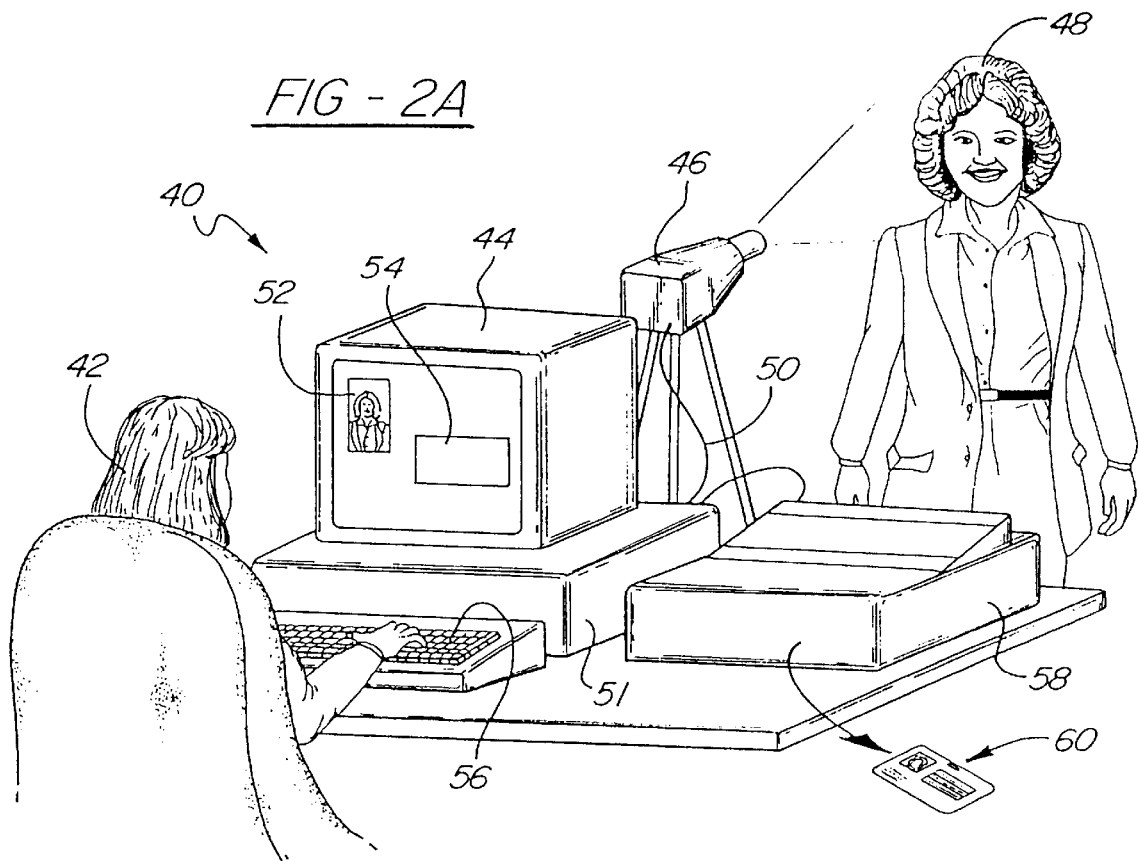
FIGS. 2A and 2B are drawings used to show the flow of information associated with the method of making and using the card of FIG. 1.
Figure 2B:
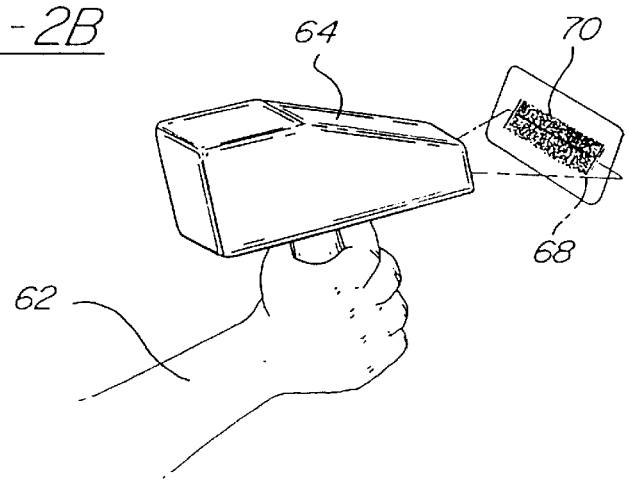

Turning now to FIG. 2, there is shown an ID card production station 40 and the route through which the card typically takes to ensure its authenticity. At production station 40, an operator 42 views a personal computer monitor 44. A camera 46 captures an image of a subject 48 and feeds a signal representative of this image along line 50 to the personal computer 51. A digitized portrait 52 of the subject appears on the screen of monitor 44 along with other fields which may be completed by operator 42 via keyboard 56. An image compression algorithm is used to reduce the amount of data required to store the image. As part of this compression, the background behind the subject may be normalized or eliminated.

Software resident on computer 51 inputs data used to generate photographic image 52 or information contained within data field 54, or both, and generates a machine-readable encoded version of the human-recognizable data on the screen of monitor 44. Software provided in accordance with the present invention formats all of this information, including the encoded version thereof, and prints them on attached printer 58. Utilizing the above techniques, card 60 similar to the one depicted in FIG. 1, is produced having both the human-recognizable information and any encoded counterparts. The card may then be laminated with commercially available equipment provided for such purposes.

For verification, card 60 is scanned by an operator 62 utilizing a stationary, table-top or hand-held portable-type of scanner 64, which holographically reads the encoded information 70 on the backside of card 60 with a laser. The information generated by scanner/decoder 64 is fed into a computer, which may be the same computer 51 shown in FIG. 2 and, from this scanned encoded information, the photographic, graphical or textual information originally encoded is regenerated. At the same time, the original data file, also resident on computer 51 is recalled and the original imagery is compared to that derived via decoding. A matching of the information is used to signify the authenticity of the card and/or the bearer.

For a variety of other purposes, including security, the encoded information 70 on the back side of card 60 may further include a wide variety of information which is not imprinted in human cognizable form on the card. For example, while the card may contain a photograph, signature, name, address and department number, and while all said information may be encoded in the two-dimensional bar code 30, two-dimensional bar code 30 may be further encoded with additional information, such as a code number or personal identification number, not otherwise visible on the card. In the preferred embodiment, such code number or personal identification number is typically encoded to discourage fraud. When the card 60 is scanned by an operator 62 utilizing scanner 64, the information generated by the scanner 64, and, from this scanned encoded information, in addition to the photographical or textual information, the non-printed information may also be regenerated. In this fashion, a security card or store clerk will be able to interrogate the card holder, requiring authentication of the code number or personal identification number encoded in bar code 30, but not otherwise printed on the card.

In operation, software associated with the invention is preferably installed on a personal computer equipped with a 486-type of microprocessor running DOS, though the system is readily ported to other computer configurations. The software is self-loading, and screens are provided on the monitor which requests identification of drives and director names, security password setup, confirmation of configuration, and the naming of the database directory and file name, if applicable. The assignment of encoding format defaults and algorithm choices are also determined and set up during this installation procedure.

Upon completion of the installation routine, the defaults selected by the user are encoded into a PDF417 image and printed. This printout is then sent to the service provider and kept on file to be used in conjunction with customer technical support.

The photographs are captured using either a black and white or color digital camera or video camera. Preferably a black and white digital camera or its equivalent, available from Logitech, Inc. is preferred. The backdrop used for the photograph may be automatically separated from the subject using system software. This software automatically resizes the image to fit the area required for the photo, whether black and white or color. The resized image is then compressed using a photographic compression algorithm then encoded using a printing algorithm specifically designed to output a PDF file. Various printers are applicable, including HP laser jet and Xerox or Canon color laser printers.

The operator 42 in FIG. 2 initializes the program via keyboard 56 or through the use of a mouse-type of pointing device. A title screen is displayed on monitor 44, and the program automatically checks to ensure that proper equipment is attached. A photograph may then be taken either by depressing a button on the camera itself or by clicking an icon provided on the computer monitor. Once taken, the photograph appears on the screen in a cropped and resized format.

Identification input screens are next preferably provided which are formatted to prompt the operator to fill in fields associated with the individual. When all fields are completed the operator begins the background processes of compression, encoding and printing. The compressed image file is tested to ensure its size fits within specification limits and, assuming it does, the selection of a scan option loads a decompression decoder. Each customer is preferably issued a unique version of the decode and display software, and it is anticipated that any changes to this portion of the program be under strict control of the publisher in much the same way that a safe or lock manufacturer keeps watch over combination codes.

The present invention provides a number of security features in addition to the two-dimensional encoding process used. For example, a printed encoded version of an image represents a mathematically compressed combined alphanumeric and binary file. To correctly decode and display the image, both the encoder and decoder algorithms must be exact mirror images. Software switches are preferably additionally provided and which are set during compression and decompression and, unless all or the variables are set correctly, the image will not encode. The input file structure must also match the decoder display format. The addition of non-display check digits to the input file when the decoder adds another layer of security to the system making the forgery of an ID instrument formed in accordance with the present invention virtually impossible.

Printing the two-dimensional code using a 0.006 dimension in the X direction makes reading a copied image nearly impossible. Additionally, laminating the code with a red filter over the symbol absolutely prohibits copying.

Further security is provided through encryption and decryption, which may be used at various stages. For instance, the two-dimensional coding may be encrypted directly and a key provided, either separately or contained within the encoded area in order to regenerate the human-recognizable indicia.

Encryption and decryption algorithms may also be provided in association with verification simply to restore the human-recognizable materials from the archival database. In this manner, an operator would not be able to access photographic graphical or textual information as originally saved without a proper description key. For the absolute higher level of security, both the photographic, graphical or textual information as originally archived and the encoded information on the card would both be encrypted, with separate keys being necessary to reconstruct either database for comparison.

We claim:

1. An identification card with protection against falsification, comprising:
   a card in the form of a thin, substrate having front and back surfaces;
   two-dimensional human-cognizable indicia imprinted on a first surface area of the card;
   a two-dimensional machine-readable code imprinted on a second surface area of the card, said two-dimensional code being imprinted using the same printing medium as that used to imprint human-cognizable indicia;
   said machine-readable code comprising an array of polygon-shaped printed cells and non-printed blank areas arranged along two independent axes, said array encoding data including first data representative of said indicia in its entirety, and second data comprising information not imprinted on said card; and
   whereby said two-dimensional code may be decoded to generate an identical version of said indicia without referencing an external data base, and to further generate an identical version of said second data without referencing an external data base, thus enabling comparisons to be made between said indicia and said generated version of said indicia to insure that said card has not been falsified, and further enabling viewing of said second data.

* * * * *